United States Patent [19]
van der Lely

[11] 3,960,219

[45] June 1, 1976

[54] SOIL CULTIVATING IMPLEMENTS

[76] Inventor: Cornelis van der Lely, 7, Bruschenrain, Zug, Switzerland

[22] Filed: Apr. 22, 1974

[21] Appl. No.: 462,942

[30] Foreign Application Priority Data
Apr. 26, 1973 Netherlands............... 7305802

[52] U.S. Cl................. 172/39; 172/60; 172/65; 172/80; 172/123; 172/387
[51] Int. Cl.² ............ A01B 33/02; A01B 49/02
[58] Field of Search ............ 172/39, 60, 63, 65, 172/70–72, 80, 118, 119, 121, 123, 169, 387, 391, 522, 523, 526

[56] References Cited
UNITED STATES PATENTS

| 510,166 | 12/1893 | Farmer | 172/39 X |
|---|---|---|---|
| 2,007,646 | 7/1935 | Gilbertson | 172/39 X |
| 2,205,188 | 6/1940 | Guddigan et al. | 172/523 X |
| 2,465,488 | 3/1949 | Sears et al. | 172/39 |
| 2,869,655 | 1/1959 | Baggott et al. | 172/387 |
| 3,084,747 | 4/1963 | Ferris | 172/39 |
| 3,698,485 | 10/1972 | Trimpe et al. | 172/65 |
| 3,783,948 | 1/1974 | Lely et al. | 172/522 X |
| 3,783,952 | 1/1974 | Van Gemert | 172/123 X |
| 3,809,166 | 5/1974 | Lely et al. | 172/59 X |
| 3,841,411 | 10/1974 | Lely et al. | 172/59 X |

FOREIGN PATENTS OR APPLICATIONS

| 1,945,404 | 9/1970 | Germany | 172/387 |
|---|---|---|---|
| 6,609,573 | 1/1968 | Netherlands | 172/65 |
| 1,051,766 | 12/1966 | United Kingdom | 172/123 |
| 192,516 | 8/1965 | U.S.S.R. | 172/122 |

Primary Examiner—Edgar S. Burr
Assistant Examiner—Paul T. Sewell
Attorney, Agent, or Firm—Mason, Mason & Albright

[57] ABSTRACT

A soil cultivator has at least one rotor mounted for rotation about a horizontal axis and rows of rigid soil working tines are secured on the rotor to be driven through the soil in a direction opposite to the travel direction of the cultivator. The tines can be curved with their free ends oriented to the rear with respect to their direction of movement through the soil. Stationary tines can be affixed in front of the rotor so that the rotor tines are moved between the stationary tines. Two rotors can be mounted side-by-side on a common shaft or axis of rotation and the shaft journalled in side plates having edge rims. A row of rotatable disc-like supporting members is arranged zig zag on a beam and the beam has arms that are adjustably connected to the cultivator frame at the rear of the rotor. Projections on the bottoms of the members induce rotation thereof. The rotor or rotors can also be supported by an elongated roller having a helical rib. The frame of the cultivator has a coupling member that can be offset with respect to the frame and an adjusting feature enables the implement to be positioned so that the rotor's axis of rotation is non perpendicular to the direction of travel.

18 Claims, 6 Drawing Figures

SOIL CULTIVATING IMPLEMENTS

According to one aspect of the invention, there is provided a soil cultivating implement of the kind set forth, wherein each rotor tine comprises a part whose free end region is orientated rearwardly with respect to the intended direction of operative travel of the rotor or corresponding rotor.

For a better understanding of the invention, and to show how the same may be carried into effect, reference will now be made, by way of example, to the accompanying drawings, in which.

Figure 1:
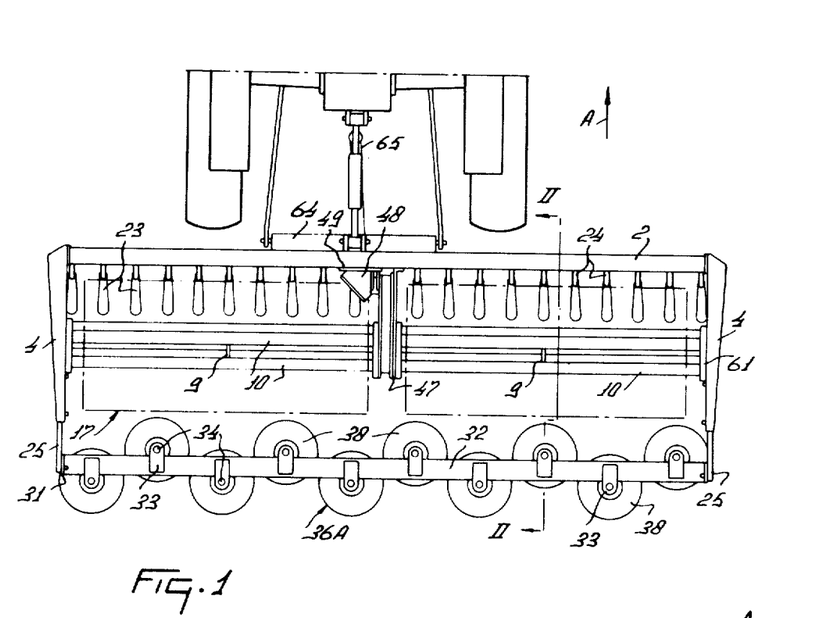
FIG. 1 is a plan view of a soil cultivating implement or cultivator in accordance with the invention connected to the rear of an agricultural tractor.
Figure 2:
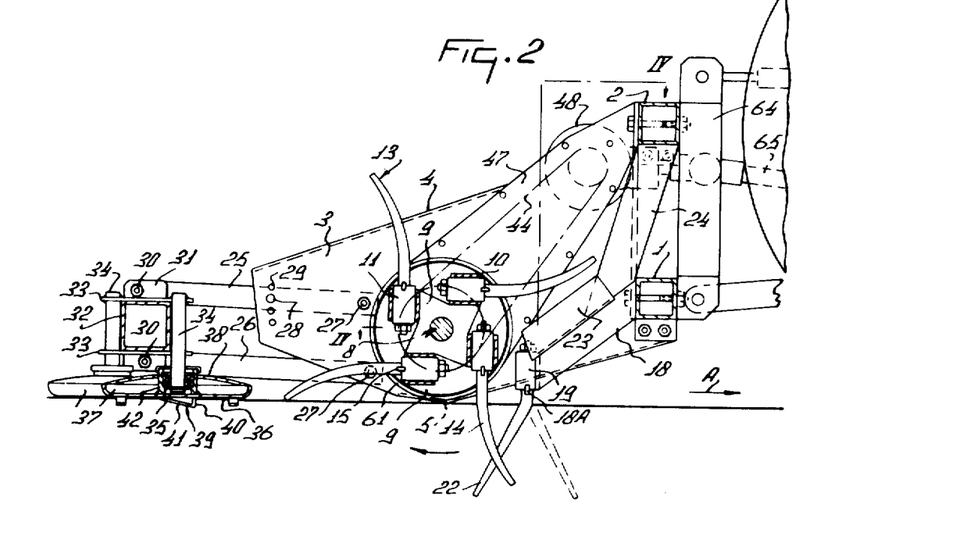
FIG. 2 is a section, to an enlarged scale, taken on the line II—II of FIG. 1.

Referring to FIGS. 1 to 5 of the drawings, the soil cultivating implement or cultivator that is illustrated has a frame which comprises lower and upper frame beams 1 and 2 that both extend substantially horizontally perpendicular to the intended direction of operative travel of the implement which is indicated by an arrow A in FIGS. 1 and 2 of the drawings. The two beams 1 and 2 are in vertically spaced apart parallel relationship, both of them being of hollow formation and both of them having a square or substantially square cross-section (see FIG. 2). Substantially vertical plates 3 interconnect the frame beams 1 and 2 at their opposite ends, both plates 3 being arranged so as to extend substantially parallel to the direction A but both of them extending rearwardly from the beams 1 and 2 with respect to that direction. The shape of one of the two substantially identical plates 3 can be seen in FIG. 2 of the drawings. Each plate 3 has an upper edge which is inclined downwardly from front to rear with respect to the direction A, said upper edges being formed throughout their lengths as bent-over rims 4. The lower edges of the plates 3 are also formed with bent-over rims 5 but, in this case, the rims 5 are provided only between the leading extremities of said lower edges relative to the direction A and locations a short distance to the rear of the midpoints of those edges with respect to the same direction. Substantially horizontal bearings 6 (FIG. 4) are carried by housings 7 releasably secured to the two plates 3 and a substantially horizontal shaft 8 that extends transverse, and normally substantially perpendicular, to the direction A in parallel relationship with the frame beams 1 and 2 is rotatably carried by the bearings 6. Plates 9 that are substantially square in shape are welded or otherwise rigidly secured to the shaft 8 close to its opposite ends and at locations therebetween in such a way that each plate 9 is substantially perpendicular to the longitudinal axis of said shaft 8.

Figure 4:
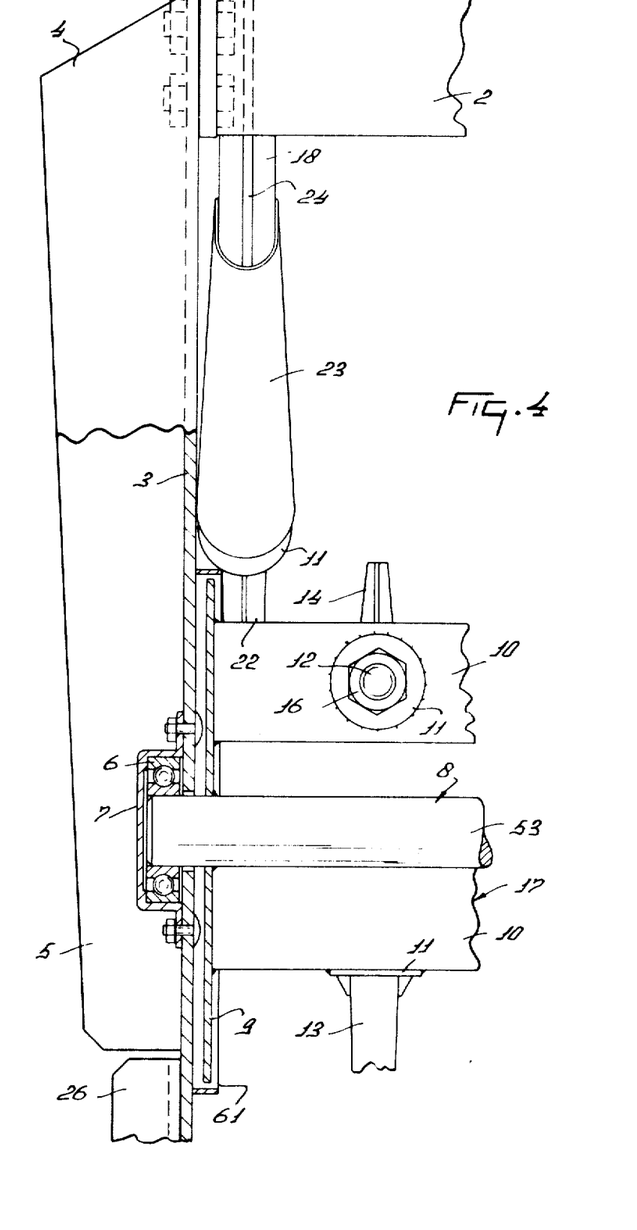
FIG. 4 is a section, to an enlarged scale, taken on the line IV—IV in FIG. 2.
Figure 5:
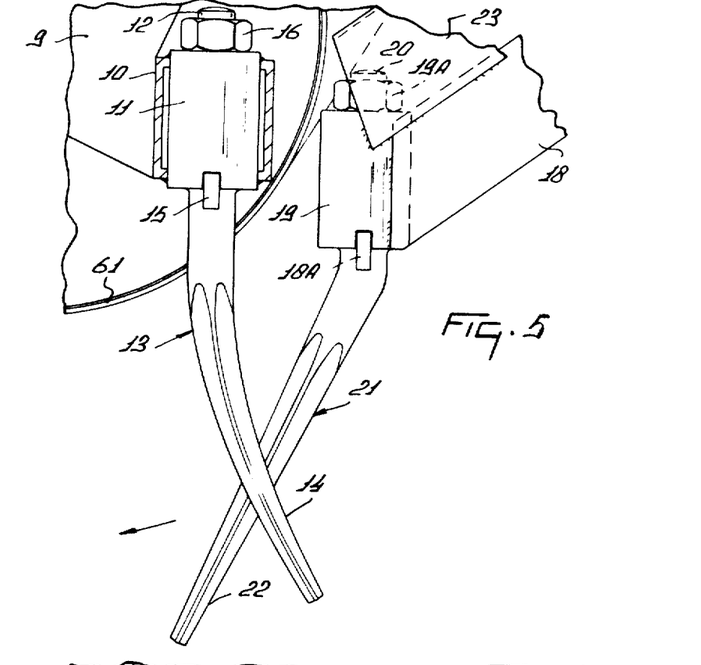
FIG. 5 is a part-sectional scrap side elevation illustrating the construction and arrangement of tines of the implement that can be seen in FIG. 2 of the drawings, to an enlarged scale and in greater detail.

Tine supports 10 of hollow formation and substantially square cross-section are welded or otherwise rigidly secured to the edges of the plates 9 so as to extend parallel to the longitudinal axis of the shaft 8 at 90° intervals therearound. Each tine support 10 carries a corresponding row of sleeve-like tine holders 11 that are arranged in the support 10 at regular intervals along its length with the holders 11 that are at the opposite ends of the row thereof being spaced from the corresponding ends of the support 10 concerned (see FIG. 4 of the drawings). The longitudinal axes of the sleeve-like holders 11 extend substantially tangentially with respect to a circle centered upon the longitudinal axis of the shaft 8 when viewed lengthwise of that axis (FIG. 2) and each holder 11 receives the fastening portion 12 of a corresponding elongated and rigid soil working tine 13 (FIG. 5). The fastening portions 12 of the tines 13 carry diametrically opposed lugs 15 which are arranged to lodge in matchingly shaped notches or recesses at the ends of the sleeve-like bodies of the corresponding holders 11 to prevent the tines 13 from turning about the longitudinal axes of their fastening portions 12 once those portions are retained in the holders 11. The fastening portions 12 are provided, in the regions of the lugs 15, with conical or other shoulders (not visible in the drawings) which bear against matchingly shaped supported surfaces (also not visible in the drawings) formed internally of the holders 11. The free end of the fastening portion 12 of each tine 13 projects from the end of the corresponding holder 11 that is remote from the notched or recessed end thereof and is formed as a screwthreaded part arranged to receive a co-operating fastening nut 16. The nuts 16 preferably have conically shaped surfaces (not visible in the drawings) that bear against gainst matchingly shaped surfaces formed internally of the holders 11 and it is also strongly preferred that said nuts 16 should incorporate inserts arranged to co-operate frictionally with the screw-threads of the fastening portions 12 to prevent vibration during operation from working the nuts 16 loose. The fastening portions 12 of the tines 13 are integrally connected to active or soil working portions 14, each of said portions 14 being straight throughout substantially the first third of its length, commencing from the corresponding fastening portion 12, after which it is uniformly curved throughout the remainder of its length in a direction such that the free end or tip of each portion 14 is oriented rearwardly with respect to the intended direction of operative rotation of the shaft 8 which is indicated by an arrow in FIGS. 2 and 5 of the drawings.

The straight part of each active or soil working portion 14 is of substantially circular cross-section but the following curved part thereof is of polygonal cross-section, said curved part tapering towards the free end or tip of the tine. The polygonal cross-section of the curved part of each active or soil working tine portion 14 is preferably a rectangular cross-section and, with this preferred cross-section, as illustrated, each of said portions 14 is progressively flattened towards the free end or tip thereof in such a way that, at a region near said free end or tip, a diagonal between two opposite corners of the corresponding portion 14, as seen in cross-section, is of considerably greater magnitude than a relatively perpendicular diagonal between the opposite two corners. The diagonal of greater magnitude at this location extends substantially parallel to the longitudinal axis of the shaft 8. As can be seen best in FIG. 5 of the drawings, the curved part of each active or soil working portion 14 is also formed throughout its length with four concave or at least hollow grooves or recesses.

The shaft 8, the tine supports 10, the tine holders 11, the tines 13 and the associated parts together constitute a soil working rotor that is generally indicated by the reference 17. It can be seen from FIG. 2 of the drawings that the plates 9, which have previously been referred to as being of substantially square shape, have four inverse angular edges which are shaped so that the angular mid-points of said edges are closer to the axis of the shaft 8 than would be the case if said edges were truly straight. Owing to the tangential disposition of the longitudinal axes of the holders 11 relative to circles centered upon the axis of the shaft 8, the fastening nuts 16, which are located rearwardly of the corresponding holders with respect to the intended direction of operative rotation of the shaft 8, are screened to some extent from stones, root debris and the like by the further parts of the plates 9.

The rear of the lower frame beam 1 with respect to the direction A carries a plurality of downwardly and rearwardly, with respect to the same direction, inclined arms 18 in regularly spaced apart relationship along the length of the beam 1. The lowermost and rearmost ends of the arms 18 carry corresponding substantially vertically disposed tine holders 19 that are of similar construction to the previously described tine holders 11. Each tine holder 19 receives the fastening portion 20 of a corresponding rigid tine 21 and it will be seen from FIG. 5 of the drawings that said fastening portions 20 are provided with diametrically opposed lugs 18A and with fastening nuts 19A that are similar in construction and function to the previously described lugs 15 and fastening nuts 16.

The tines 21 occupy fixed positions with respect to the frame of the implement and each of them has a straight active or soil working portion 22 that makes an angular junction with the corresponding straight fastening portion 20 at a location that substantially coincides with the position of the lugs 18A. A first upper part of each active or soil working portion 22 is of substantially circular cross-section but a lower straight part thereof is of polygonal, and preferably square, cross-section, as illustrated. This latter part tapers towards the lowermost free end or tip of the tine 21 and is progressively flattened in a similar manner to the previously described curved part of each active or soil working portion 14 of each rotary tine 13. Apart from their respective straight and curved configurations, the parts of the active or soil working portions 22 and 14 that are under consideration are similar to that the greatest diagonal of a cross-section taken near the free end or tip of each portion 22 again extends substantially parallel to the longitudinal axis of the shaft 8 and to the frame beams 1 and 2. The parts of the active or soil working portions 22 that are of square or other polygonal cross-section are again formed with concave or at least hollow grooves throughout their lengths, there being four such grooves with the preferred rectangular cross-section that is illustrated. It should be noted that, due to the provision of each tine 13 and 21 with two diametrically opposed lugs 15 and 18A, the fastening portions 12 and 20 thereof can be turned through 180° about their own longitudinal axes in the holders 11 and 19 after temporarily loosening the nuts 16 and 19A. Thus, the tines 21 can be alternatively disposed in the positions shown by broken lines in FIG. 2 of the drawings and similar positions are possible for the tines 13 in which their active or soil working portions 14 are forwardly orientated with respect to the intended direction of operative rotation of the shaft 8. Such an operating position of the tines 13 will, however, only vary infrequently be employed on most farms and the like.

The arms 18 which indirectly carry the tines 21 are disposed in positions which are such that, during the use of the implement, the rotary tines 13 will move between them. Thus, in either of the two possible dispositions of the portions 22 of the tines 21 that are shown in FIG. 2 of the drawings, the portions 14 of the rotary tines 13 will pass through the spaces between those portions 22. The top of each arm 18 is provided with a corresponding screen 23 (FIGS. 4 and 5 of the drawings) of inverted U-shaped cross-section, the downwardly directed limbs of the screens 23 being secured to the opposite sides of the arms 18. As seen in plan view (FIG. 4), the lowermost end of each screen 23 is larger than the uppermost end thereof so as to afford the required protection to the corresponding fastening nut 19A and to the exposed screwthread of the co-operating fastening portion 20. Supports 24 (FIGS. 2 and 4 of the drawings) extend between the lower surface of the upper frame beam 2 and the top of each arm 18, rear regions of the supports 24 being covered by the corresponding screens 23, which are also secured to the supports 24, where said supports 24 meet the arms 18.

Each of the side plates 3 of the implement is provided, behind the shaft 8 with respect to the direction A, with upper and lower stub shafts 27 which define substantially horizontally aligned axes about which upper and lower arms 25 and 26 are turnable. The substantially horizontal axis afforded by the upper stub shafts 27 is at a slightly higher level than that of the axis of the shaft 8 while the parallel axis afforded by the lower stub shafts 27 is at a lower level than that of the shaft 8. The upper arms 25 are turnable alongside curved rows of holes 29 in the side plates 3, said holes 29 all being equidistant from the substantially horizontal axis defined by the upper stub shafts 27. The upper arms 25 are formed with single holes that can be brought into register with any chosen ones of the holes 29 and horizontal bolts 28 are provided for entry through the holes in the arms 25 and through chosen holes 29 to retain the upper arms 25 in corresponding angular settings about the axis defined by the upper stub shafts 27. The rearmost ends of the arms 25 and 26 with respect to the direction A are pivotally connected to corresponding brackets 31 by upper and lower stub shafts 30 that define upper and lower substantially horizontal axes that are parallel to those defined by the upper and lower stub shafts 27. The brackets 31 are rigidly interconnected by a hollow beam 32 that extends parallel to the shaft 8 and to the frame beams 1 and 2 and that preferably, as illustrated, is of square cross-section. It will be evident that the description which has just been given and from FIG. 2, in particular, of the drawings, that the beam 32 is connected to the side plates 3 by a parellelogram linkage which comprises the upwardly and downwardly turnable arms 25 and 26, the beam 32 thus being movable to different horizontal levels relative to the frame beams 1 and 2

(independent upon the holes 29 that are chosen for co-operation with the bolts 28) without tilting.

The beam 32 is provided at regular intervals along its transverse length with horizontally disposed pairs of upper and lower lugs 33 that project alternately forwardly and rearwardly from said beam 32 with respect to the direction A. The free ends of the lugs 33 carry vertical or substantially vertical shafts 34 whose lowermost parts project below the lower lugs 33 and the bottom of the beam 32. Substantially vertical bearings 35 are provided at the lowermost ends of the shafts 34 and ground-engaging parts in the form of generally horizontally disposed supporting discs 36 are freely rotatable around the axes of the shafts 34 with the aid of the corresponding bearings 35. The alternate forward and rearward disposition of the shafts 34 with respect to the beam 32 and the direction A means that immediately neighbouring supporting discs 36 along the beam 32 are located at different distances behind the axis of the shaft 8 with respect to the direction A and as seen in plan view (FIG. 1). As seen in FIG. 1, there is a single row of the supporting discs 36 which row extends in a zig-zag manner transversely across the working width of the implement. Each of the supporting discs 36 is formed at its periphery with an upwardly directed rim 37 which is joined by a domed cover plate 38. The lower ground-engaging surface of each supporting disc 36 is formed with four downward projections 39 that are equally spaced from the axis of the corresponding shaft 34 at substantially 90° intervals around that axis. Each of the projections 39 is of ratchet-toothed configuration having one surface 40 that is substantially vertically parallel to the axis of the corresponding shaft 34 and one surface 41 which is steeply inclined to that axis and less steeply inclined to the horizontal. When the supporting discs 36 are in contact with the ground surface and the implement is moving in the direction A, there will be one or two surfaces 40 at one side of each shaft 34 that is/are forwardly orientated with respect to the direction A and one or two surfaces 41 at the opposite side of that shaft 34 that are similarly orientated with respect to the direction A. The result will be to tend to produce a constant but more or less irregular rotation of each supporting disc 36 about the axis of the corresponding shaft 34. A central region of each supporting disc 36 is provided on its upper surface with a housing sleeve 42 for the corresponding bearing 35. The beam 32 and its supporting discs 36 together afford a supporting member that is generally indicated by the reference 36A.

A sprocket wheel 43 (FIG. 3) is rigidly but indirectly secured to the shaft 8 of the rotor 17 in a central region of that shaft and a transmission chain 44 is passed around the sprocket wheel 43 and around a further smaller sprocket wheel 45 fastened to a horizontal shaft 46. The shaft 46 is rotatably journalled in a gear box 48 fastened to a substantially vertical plate 49 secured to the rear of the upper frame beam 2 and its axis is substantially parallel to that of the shaft 8, and thus substantially perpendicular to the direction A, at a location a short distance behind the frame beam 2 with respect to the direction which has just been mentioned. The transmission chain 44 and the sprocket wheels 43 and 45 are surrounded by a protective casing 47 secured to the gear box 48 and also to the frame beam 2 by bolts 62. The end of the shaft 46 that is located internally of the gear box 48 carries a bevel pinion 50 whose teeth are in driven mesh with those of a further bevel pinion 51 carried by a shaft 52 whose opposite end projects substantially horizontally forwardly from the front of the gear box 48 with respect to the direction A to serve as a rotary input shaft of the implement.

Figure 3:
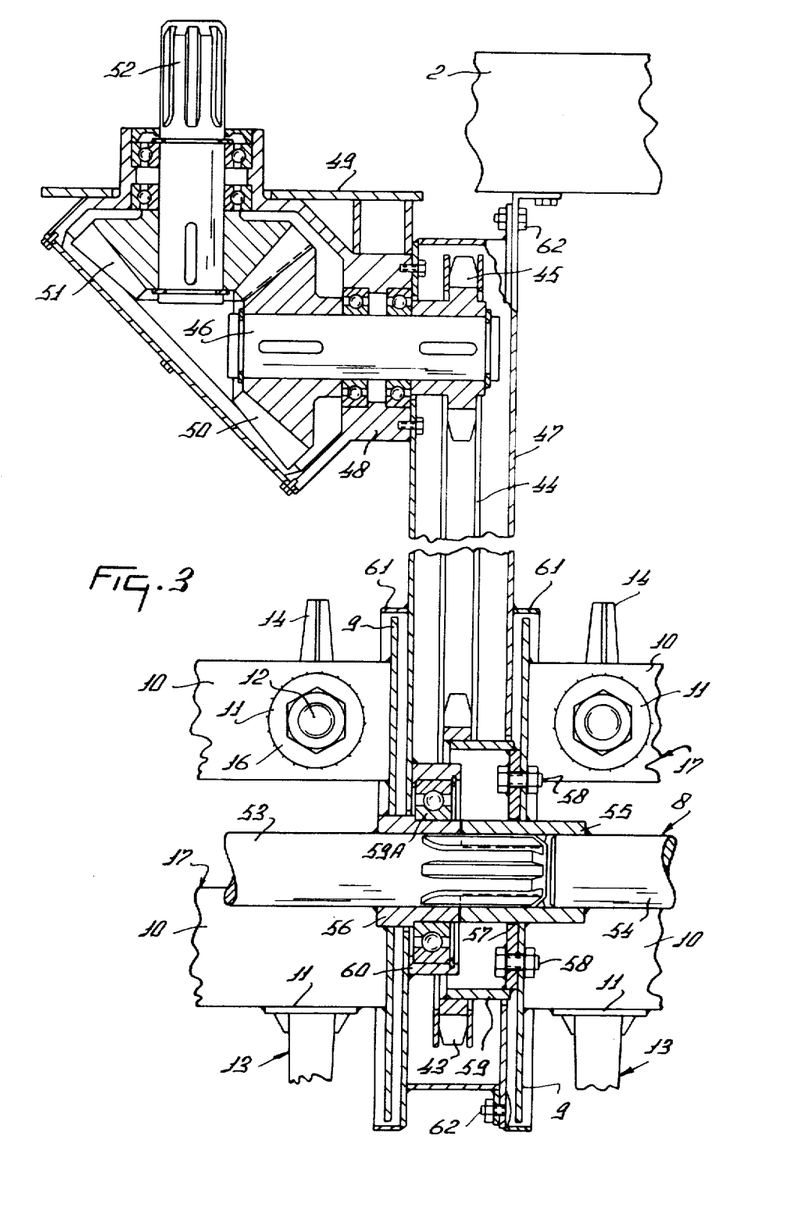
FIG. 3 is a sectional plan view, to a further enlarged scale, illustrating details of a drive transmission to a soil working rotor of the cultivating implement.

In order to make the mounting of the sprocket wheel 43 readily possible on the shaft 8 of the rotor 17, said shaft 8 is, in fact, afforded by two separate but coaxial portions 53 and 54. The end of the shaft portion 53 that is arranged for co-operation with an end of the shaft portion 54 is of splined construction (see FIG. 3) and is entered into a matching interval splined sleeve 55 welded or otherwise rigidly secured to the co-operating end of the shaft portion 54. The shaft portion 53 is surrounded, close to the splined end thereof which has just been discussed, by a shouldered sleeve 56 whose end abuts against the free end of the sleeve 55 when the two shafts 53 and 54 are operatively connected to one another as illustrated in FIG. 3 of the drawings. Each of the two sleeves 55 and 56 has a corresponding one of the two plates 9 that carry the tine supports 10 rigidly secured to it, the plate 9 corresponding to the sleeve 55 being releasably secured by small bolts 58 to an annulus 57 fastened to a ring 59 that surrounds the shaft 8 and to the outer surface of which the sprocket wheel 43 is fastened at the end of the ring 59 remote from the corresponding plate 9. A housing ring 60 surrounds the portion of the shouldered sleeve 56 that is of smaller diameter and a ball bearing 59A is lodged in said housing ring 60 around the sleeve 56. The housing ring 60 is welded or otherwise rigidly secured to an inner surface of the protective casing 47 and it will be noted from FIG. 3 of the drawings that the outer surfaces of both sides of that casing carry rings 61 which closely surround the outer edges of the neighbouring plates 9. The casing 47 is, in fact, formed in two parts one of which is secured to the frame beam 2 by the bolts 62 so that, when required, the shaft portion 54, the sleeve 55, the sprocket wheel 43 and the corresponding portion of the casing 47 can readily be removed.

The fronts of the hollow frame beams 1 and 2 with respect to the direction A have a coupling member or trestle 64 of generally triangular configuration secured to them, said coupling member or trestle 64 being located substantially in register with the gear box 48 with respect to the direction A but being offset to some extent towards the lefthand side of the implement from the midpoints of the frame beams 1 and 2 as seen in the plan view of FIG. 1.

In the use of the soil cultivating implement or cultivator that has been described, its coupling member or trestle 64 is connected to the three-point lifting device or hitch of an agricultural traactor at other operating vehicle in the manner which is generally known per se and which can be seen in outline in FIGS. 1 and 2 of the drawings. The input shaft 52 of the gear box 48 is placed in driven connection with the power take-off shaft of the same agricultural tractor or other operating vehicle by way of an intermediate telescopic transmission shaft 65 that is of a construction which is known per se having universal joints at its opposite ends. The working depth of the rotor 17 is brought to a setting appropriate to the work that is to be carried out and to the nature and condition of the soil by entering the bolts 28 in appropriate holes 29 to bring the supporting member 36A to the required level relative to the frame beams 1 and 2. The three-point lifting device or hitch of the agricultural tractor or other operating vehicle can be raised or lowered, as required, to enable the setting which has just been mentioned to be changed. The rotor 17 revolves in the direction indicated by arrows in FIGS. 2 and 5 of the drawings which direction is such that, as previously mentioned, parts of the active or soil working portions 14 of the rotary tines 13 are orientated rearwardly relative to that direction as said tines move through the soil. The particular cross-sectional configuration of the tapering curved parts of the active or soil working portions 14 of the tines 13 that has been described above produces a very intensive crumbling of the worked soil without, however, much displacement of moist soil and very little, if any, smearing of such soil.

The use of the tines 13 having the particular shape and disposition that has been described substantially prevents the formation of a plough sole, such formation tending to impede the draingage of rain and other moisture into the sub-soil with an adverse effect upon the air and water economy of the soil as a whole. The non-rotary tines 21 also greatly assist in breaking up any already existing plough sole, especially when those tines 21 are disposed in the positions indicated by broken lines in FIGS. 2 of the drawings, said tines 21 co-operating with the tines 13 to shed adhering material from both of them as will be described in greater detail below.

The supporting member 36A which follows the rotor 17 is very effective in maintaining the desired working depths of the tines 21 and 13 particularly on moist and light soils. In addition to performing their supporting function, the discs 36 serve to level the soil worked by the tines 21 and the rotor 17, the rotation of the supporting discs 36 tending to produce a well flattened, finely crumbled and slightly compressed surface which is generally suitable for use as a seed bed without further work. The arrangement of the supporting discs 36 in a single zig-zag row as has been described above increases the supporting effect of the member 36A in the direction A and the form of mounting of the tines 13 and 21 that has been described enables any one or more thereof to be readily exchanged or replaced and enables alternative working positions thereof to be employed without difficulty as is illustrated in broken lines in FIG. 2 of the drawings in respect of the tines 21.

Since the coupling member or trestle 64 is only offset laterally to the left, as seen in FIG. 1 of the drawings, from the midpoints of the frame beams 1 and 2 by a short distance, the input shaft 52 of the gear box 48 is disposed substantially centrally of said coupling member or trestle 64. The arms 18 which indirectly support the non-rotary tines 21 and their co-operating screens 23 do not become clogged by weeds, root debris and the like to any serious extent during the use of the cultivating implement because any such material tending momentarily to stick behind the arms 18 is scraped off the arms and their screens 23, and also off the non-rotary tines 21, by the tines 13 that pass regularly therebetween during the use of the implement. The rearwardly trailing disposition of the curved parts of the active or soil working portions 14 of the rotary tines 13, which disposition is the one that will be employed for most cultivating operations, is such that the tines 13 tend to be self-cleaning as any adhering material is dragged off their rearwardly orientated parts as they pass through the soil.

Figure 6:
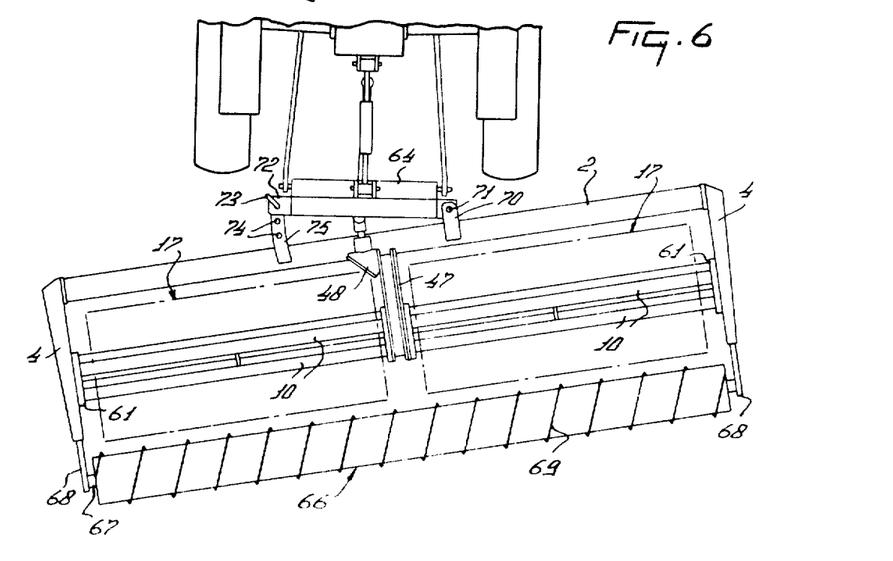
FIG. 6 is a plan view of an alternative embodiment of a cultivating implement or cultivator in accordance with the invention connected to the rear of an agricultural tractor.

FIG. 6 of the drawings illustrates an alternative soil cultivating implement or cultivator in accordance with the invention in which, however, the frame and rotor construction is similar or identical to that which has been described above. In this embodiment, an alternative supporting member 66 is employed, said supporting member being in the form of a ground roller whose opposite ends carry substantially horizontally aligned stub shafts 67 rotatably received in bearings carried by arms 68. The arms 68 are turnable upwardly and downwardly about a substantially horizontal axis afforded by stub shafts connected to the side plates 3 of the implement to the rear of the shaft 8, said arms 68 being provided with means, similar to the bolts 28 and holes 29, to retain them in chosen angular settings about the axis which has just been mentioned and thus to retain the supporting member 66 at a corresponding supporting level with respect to the frame of the implement. It will be realised that, with this construction, it is unnecessary to provide a parallelogram linkage between the supporting member 66 and the side plates 3.

The ground roller which affords the supporting member 66 is formed around its apertured outer surface with a helically wound rib 69 whose pitch substantially corresponds to the diameter of the roller. In this embodiment, the coupling member or trestle 64 is secured to a member which is turnable relative to the frame beams 1 and 2 about a substantially vertical axis afforded by pivots 71 carried by forwardly directed lugs 70 secured to the frame beams 1 and 2. Curved lugs 75 formed with holes 74 project forwardly from the frame beams 1 and 2 at the side of said member remote from the pivots 71 and said member is formed with aperturedd lugs 72 through the holes in which vertical locking pins 73 can be entered to co-operate with chosen ones of the holes 74. The holes 74 are, of course, all equidistant from the axis afforded by the pivots 71 and it will be seen from FIG. 6 of the drawings that an operating position of the implement can be employed in which the longitudinal axis of the shaft 8 is non-perpendicularly inclined to the direction A. A very intensive working of the soil is produced with such a disposition of the shaft 8 and any lateral deflection of the worked soil which would otherwise tend to take place is counteracted to a large extent by the helical rib 69 on the roller affording the supporting member 66, said rib 69 being wound in an anticlockwise direction, considered axially of the roller, so that the rotating roller will tend to move any laterally displaced soil back to substantially the position from which it was originally moved. It is, of course, within the scope of the invention to employ a construction which is symmetrically opposite to that illustrated in FIG. 6 of the drawings as regards the left and right-hand sides of the implement.

Although certain features of the soil cultivating implements or cultivators that have been described and/or that are illustrated in the accompanying drawings will be set forth in the following claims as inventive features, it is emphasised that the invention is not necessarily limited to those features and that it includes within its scope each of the parts of each soil cultivating implement or cultivator that has been described and/or that is illustrated in the accompanying drawings both individually and in various combinations.

What we claim is:

1. A soil cultivating implement comprising a frame movable over the ground and at least one rotor supported on said frame, said rotor being mounted for rotation about a substantially horizontal axis and having a plurality of elongated soilworking tines, driving means connected to said rotor and said tines, said driving means driving the tines through the soil in a direction generally parallel to the direction of travel of said implement, said tines each having a lower free end that is orientated rearwardly with respect to the normal direction of rotation of said rotor, said tines each having a fastening portion mounted in a corresponding holder on support means of said rotor and said holder having a longitudinal axis, said longitudinal axis of the holder and said fastening portion extending substantially tangentially with respect to a circle concentric with said axis of rotation.

2. An implement as claimed in claim 1, wherein said frame has a coupling member with adjusting means, whereby the axis of rotation of said rotor is positionable in a non-perpendicular direction relative to the normal direction of travel of said implement.

3. An implement as claimed in claim 1, wherein further tines are rigidly secured to said frame in front of the rotor.

4. An implement as claimed in claim 1, wherein said tines each include a soil-working portion, at least part of which is of uniformly curved configuration towards its free end.

5. An implement as claimed in claim 4, wherein said part is substantially rectangular in cross-section and tapers towards the free end, the diameter between opposite corners of a cross-section of that part varying at different locations therealong.

6. An implement as claimed in claim 5, wherein the maximum diameter between opposite corners of a cross-section of said curved part taken adjacent said free end, extends substantially parallel to the axis of rotation of said rotor.

7. An implement as claimed in claim 1, wherein said rotor has four rows of tines and said rows extend generally parallel to said axis of rotation and are angularly spaced apart from one another at 90° intervals around said axis of rotation.

8. An implement as claimed in claim 1, wherein said fastening portion has lugs that cooperate with notches in said holder and also has a screwthreaded part that receives a fastening nut to secure said fastening portion in said holder.

9. An implement as claimed in claim 1, wherein a horizontally disposed ground supporting member is positioned to the rear of said rotor to control the working depth of the rotor, said supporting member comprising at least one rotatable ground engaging support member which is freely turnable about a substantially vertical axis.

10. An implement as claimed in claim 1, wherein said tine holders are mounted on hollow tine supports and said supports are spaced from one another around said axis of rotation, said tine supports being secured to plates which extend substantially perpendicular to said axis of rotation.

11. A soil cultivating implement comprising a frame movable over the ground and at least one rotor supported on said frame, said rotor being mounted for rotation about a substantially horizontal axis and having a plurality of elongated soil-working tines mounted in generally straight rows, driving means connected to said rotor and said tines, said driving means connected to drive the tines through the soil in a direction generally parallel to the direction of travel of said implement, coupling means on the forward portion of said frame, said tines each having a lower free end that is orientated rearwardly with respect to the normal direction of rotation of said rotor, further tines being rigidly secured to said frame in a row in front of and adjacent said rotor, first mentioned said tines each having a fastening portion mounted in a corresponding holder on support means of said rotor and said holder having a longitudinal axis, said longitudinal axis of the holder and said fastening portion extending substantially tangentially with respect to a circle concentric with said axis of rotation, said first-mentioned tines being movable between said further tines during their movement through the soil and the rotation of said rotor.

12. An implement as claimed in claim 11, wherein said further tines each include a lower active portion which trails rearwardly with respect to the normal direction of travel of said implement and said portion is straight in configuration and has a polygonal cross-section part.

13. An inplement as claimed in claim 12, wherein further holders are mounted on said implement and said further tines each have a fastening portion retained in a corresponding further holder, said fastening portion carrying lugs which cooperate with notches at the lower end of the corresponding further holder and a screw-threaded part that is fitted with a fastening nut at an upper end of that holder, each further holder being supported on a respective arm which is inclined upwardly and forwardly from that holder with respect to the normal direction of travel and a screen is located at the top of each arm.

14. An implement as claimed in claim 12, wherein said polygonal cross-section part tapers towards a lower free end thereof, said part being shaped, whereby diagonals of the cross-section part, vary in magnitude therealong and hollow grooves are formed in said part and said grooves extend throughout substantially the whole of the lengths of said part.

15. A soil cultivating implement comprising a frame movable over the ground and at least one rotor supported on said frame, said rotor being mounted for rotation about a substantially horizontal axis and having a plurality of elongated soil-working tines, driving means connected to said rotor, said tines being driven through the soil in a direction generally parallel to the direction of travel of said implement, said tines being mounted in corresponding holders and said holders being mounted on spaced apart tine supports that extend generally parallel to said axis of rotation, each holder having a longitudinal axis and said tines each having a fastening portion mounted in a corresponding holder, the longitudinal axis of the holder and the fastening portion extending substantially tangentially with respect to a circle concentric with said axis of rotation.

16. A soil cultivating implement comprising a frame movable over the ground and at least one rotor supported on said frame, said rotor being mounted for rotation about a substantially horizontal axis and having a plurality of elongated soil-working tines, driving means connected to said rotor and said tines being driven through the soil in a direction generally parallel to the direction of travel of said implement, said tines each having a fastening portion mounted in a corresponding holder on support means of said rotor and said holder having a longitudinal axis, said longitudinal axis of the holder and said fastening portion extending substantially tangentially with respect to a circle concentric with said axis of rotation, said fastening portion having lugs that cooperate with notches in said holder and also having a screw-threaded part that receives a fastening nut to secure said fastening portion in said holder.

17. A soil cultivating implement comprising a frame movable over the ground and at least one rotor supported on said frame, said rotor being mounted for rotation about a substantially horizontal axis and having a plurality of elongated soil-working tines, driving means connected to said rotor and said tines being driven through the soil in a direction generally parallel to the direction of travel of said implement, said tines each having a free end that is orientated rearwardly with respect to the normal direction of rotation of said rotor, said tines each having a fastening portion mounted in a corresponding holder on support means of said rotor and said holder having a longitudinal axis, said longitudinal axis of the holder and said fastening portion extending substantially tangentially with respect to a circle concentric with said axis of rotation, said fastening portion having lugs that cooperate with notches in said holder and also having a screw-threaded part that receives a fastening nut to secure said fastening portion in said holder.

18. An implement as claimed in claim 17, wherein there are two side-by-side rotors mounted for rotation about the same axis of rotation.

* * * * *